(12) United States Patent
Krkljus et al.

(10) Patent No.: US 10,446,833 B2
(45) Date of Patent: Oct. 15, 2019

(54) ELECTRODE MATERIAL INCLUDING LITHIUM TRANSITION METAL OXIDE, LITHIUM IRON PHOSPHATE, FURTHER IRON-PHOSPHOROUS COMPOUND. AND CARBON, AND LITHIUM BATTERY INCLUDING THE SAME

(71) Applicant: BASF SE, Ludwigshafen (DE)

(72) Inventors: Ivana Krkljus, Ludwigshafen (DE); Aleksei Volkov, Ludwigshafen (DE); Carsten Sueling, Frankenthal (DE)

(73) Assignee: BASF SE, Ludwigshafen (DE)

( * ) Notice: Subject to any disclaimer, the term of this patent is extended or adjusted under 35 U.S.C. 154(b) by 209 days.

(21) Appl. No.: 15/023,046

(22) PCT Filed: Sep. 16, 2014

(86) PCT No.: PCT/EP2014/069657
§ 371 (c)(1),
(2) Date: Mar. 18, 2016

(87) PCT Pub. No.: WO2015/040005
PCT Pub. Date: Mar. 26, 2015

(65) Prior Publication Data
US 2016/0233488 A1 Aug. 11, 2016

(30) Foreign Application Priority Data
Sep. 20, 2013 (EP) ..................................... 13185453

(51) Int. Cl.
*H01M 4/36* (2006.01)
*H01M 4/131* (2010.01)
*H01M 4/136* (2010.01)
*H01M 4/505* (2010.01)
*H01M 4/525* (2010.01)
*H01M 4/58* (2010.01)
*H01M 4/62* (2006.01)
*C01G 49/00* (2006.01)
*C01G 53/00* (2006.01)
*C01D 15/02* (2006.01)
*H01M 10/0525* (2010.01)
*H01M 4/02* (2006.01)

(52) U.S. Cl.
CPC ............ *H01M 4/364* (2013.01); *C01D 15/02* (2013.01); *C01G 49/009* (2013.01); *C01G 53/50* (2013.01); *H01M 4/131* (2013.01); *H01M 4/136* (2013.01); *H01M 4/505* (2013.01); *H01M 4/525* (2013.01); *H01M 4/5825* (2013.01); *H01M 4/625* (2013.01); *H01M 10/0525* (2013.01); *C01P 2002/50* (2013.01); *C01P 2004/51* (2013.01); *C01P 2004/61* (2013.01); *C01P 2004/62* (2013.01); *C01P 2004/64* (2013.01); *C01P 2006/12* (2013.01); *H01M 4/5805* (2013.01); *H01M 2004/028* (2013.01); *H01M 2220/20* (2013.01)

(58) Field of Classification Search
CPC ...... H01M 4/131; H01M 4/136; H01M 4/505; H01M 4/525; H01M 4/5825; H01M 4/625; H01M 10/0525; C01G 49/009; C01G 53/50; C01D 15/02
USPC ........ 429/221, 223, 224, 231.3, 231.95, 232
See application file for complete search history.

(56) References Cited

U.S. PATENT DOCUMENTS

| 6,514,640 B1 * | 2/2003 | Armand | C01B 25/45 |
| | | | 429/218.1 |
| 2006/0222955 A1 * | 10/2006 | Ogawa | H01M 2/1653 |
| | | | 429/254 |
| 2007/0059602 A1 | 3/2007 | Morishima et al. | |
| 2008/0248390 A1 | 10/2008 | Yada et al. | |
| 2009/0068561 A1 * | 3/2009 | Sun | H01M 4/131 |
| | | | 429/223 |

(Continued)

FOREIGN PATENT DOCUMENTS

| EP | 2 618 405 A2 | 7/2013 |
| JP | 2008-235150 A | 10/2008 |

(Continued)

OTHER PUBLICATIONS

Lin et al., Effects of carbon coating and iron phosphides on the electrochemical properties of LiFePO$_4$/C, Mar. 2008, Journal of Power Sources, 184, 444-448 (Year: 2008).*

Herle et al., Nano-network electronic conduction in iron and nickel olivine phosphates, Feb. 2004, Nature Materials, 3, 147-152 (Year: 2004).*

Delacourt et al., The existence of a temperature-driven solid solution in LiPO$_4$ for 0 ≤ x ≤ 1, Feb. 2005, Nature Materials, 4, 254-260 (Year: 2005).*

International Search Report dated Dec. 12, 2014 in PCT/EP2014/069657 filed Sep. 16, 2014.

(Continued)

*Primary Examiner* — Sean P Cullen
(74) *Attorney, Agent, or Firm* — Oblon, McClelland, Maier & Neustadt, L.L.P.

(57) ABSTRACT

Electrode materials comprising (a) at least one compound of general formula (I) $Li_{(1+x)}[Ni_aCo_bMn_cM1_d]_{(1-x)}O_2$ (I) the integers being defined as follows: x is in the range of from 0.01 to 0.05, a is in the range of from 0.3 to 0.6, b is in the range of from zero to 0.35, c is in the range of from 0.2 to 0.6, d is in the range of from zero to 0.05, a+b+c+d=1 $M^1$ is at least one metal selected from Ca, Zn, Fe, Ti, Ba, Al, (b) at least one compound of general formula (II) $LiFe_{(1-x)}M2_yPO_4$ (II) y is in the range of from zero to 0.8 $M^2$ is at least one element selected from Ti, Co, Mn, Ni, V, Mg, Nd, Zn and Y, that contains at least one further iron-phosphorous compound, in form of a solid solution in compound (b) or in domains, (c) carbon in electrically conductive modification.

16 Claims, No Drawings

(56) References Cited

U.S. PATENT DOCUMENTS

| | | |
|---|---|---|
| 2010/0163790 A1 | 7/2010 | Ceder et al. |
| 2011/0091772 A1* | 4/2011 | Mishima ............... C01B 25/45 429/221 |
| 2011/0229764 A1* | 9/2011 | Kawakami .......... H01M 4/0471 429/221 |
| 2012/0141873 A1 | 6/2012 | Kim et al. |
| 2012/0231334 A1* | 9/2012 | Kinoshita .............. B82Y 30/00 429/211 |
| 2013/0183579 A1 | 7/2013 | Kim et al. |

FOREIGN PATENT DOCUMENTS

| | | |
|---|---|---|
| JP | 2009-263222 A | 11/2009 |
| KR | 20130107892 A * | 10/2013 |
| WO | 2008/088180 A1 | 7/2008 |
| WO | 2012/155195 | 11/2012 |

OTHER PUBLICATIONS

U.S. Appl. No. 14/770,147, filed Aug. 25, 2015, Ivana Krkljus, et al.

Extended European Search Report dated Feb. 25, 2014 in Patent Application No. 13185453.1.

Do-Kyun Kim, et al., "Effect of synthesis conditions on the properties of $LiFePO_4$ for secondary lithium batteries", Journal of Power Sources, vol. 159, 2006, pp. 237-240.

P. Axmann, et al., "Nonstoichiometric $LiFePO_4$: Defects and Related Properties", Chem. Mater., vol. 21, No. 8, 2009, pp. 1636-1644.

* cited by examiner

ELECTRODE MATERIAL INCLUDING LITHIUM TRANSITION METAL OXIDE, LITHIUM IRON PHOSPHATE, FURTHER IRON-PHOSPHOROUS COMPOUND. AND CARBON, AND LITHIUM BATTERY INCLUDING THE SAME

The present invention is directed towards electrode materials comprising
(a) at least one compound of general formula (I)

$$Li_{(1+x)}[Ni_aCo_bMn_cM^1_d]_{(1-x)}O_2 \quad (I)$$

the integers being defined as follows:
x is in the range of from 0.01 to 0.05,
a is in the range of from 0.3 to 0.6,
b is in the range of from zero to 0.35,
c is in the range of from 0.2 to 0.6,
d is in the range of from zero to 0.05, $$a+b+c+d=1$$

$M^1$ is at least one metal selected from Ca, Zn, Fe, Ti, Ba, Al,
(b) at least one compound of general formula (II)

$$LiFe_{(1-y)}M^2_yPO_4 \quad (II)$$

y is in the range of from zero to 0.8
$M^2$ is at least one element selected from Ti, Co, Mn, Ni, V, Mg, Nd, Zn and Y,
that contains at least one further iron-phosphorous compound, in form of a solid solution in component (b) or in domains,
(c) carbon in electrically conductive modification.

Furthermore, the present invention is directed towards a method for making inventive electrode materials. Furthermore, the present invention is directed towards the use of inventive electrode materials.

Lithium ion secondary batteries are modern devices for storing energy. Many application fields have been and are contemplated, from small devices such as mobile phones and laptop computers through car batteries and other batteries for electromobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

In US 2007/059602 materials have been disclosed that comprise at least one lithiated transition metal oxide and FePO$_4$ In WO 2008/088180, certain hybride electrode materials have been disclosed that comprise two lithium containing composite oxides, one being preferably a lithium iron phosphate and the other one being a lithium transition metal oxide such as LiCoO$_2$ or LiNi$_{1/3}$Co$_{1/3}$Mn$_{1/3}$O$_2$. Preferably, the LiCoO$_2$ or LiNi$_{1/3}$Co$_{1/3}$Mn$_{1/3}$O$_2$, respectively, is surface-coated with lithium iron phosphate. The materials disclosed exhibit an improved safety performance.

However, they still leave room for improvement with respect to their capacity at various temperatures, especially at temperatures of 45° C. or above, in particular to the capacity loss at such high temperatures. Furthermore, the cycle stability and C rate performance at higher temperatures such as 45° C. or more may be improved as well.

In addition, charging and discharging behaviour of cells and batteries manufactured from the above materials still leave room for improvement. Charging in many cases takes a lot of time.

It was therefore an objective of the present invention to provide cells and batteries with an improved charging and discharging behaviour. It would be desirable that such cells and batteries also display an improved capacity at 45° C. or higher, in particular compared to the capacity loss at such high temperatures. It was furthermore an objective to provide a process for making cells and batteries with an improved charging and discharging speed. It would be desirable that such cells and batteries also display an improved capacity at 45° C. or higher in particular compared to the capacity loss at such high temperatures.

Accordingly, the materials defined at the outset have been found, hereinafter also being referred to as inventive electrode materials or electrode materials according to the invention.

Inventive electrode materials comprise at least three components, components (a), (b) and (c). Said three components will be described in more detail below.

Component (a) is characterized by the general formula (I)

$$Li_{(1+x)}[Ni_aCo_bMn_cM^1_d]_{(1-x)}O_2 \quad (I)$$

the integers being defined as follows:
x is in the range of from 0.01 to 0.07, preferably up to 0.05, even more preferably in the range of from 0.02 to 0.04,
a is in the range of from 0.3 to 0.6, preferably from 0.32 to 0.50,
b is in the range of from zero to 0.35, preferably from 0.20 to 0.33,
c is in the range of from 0.2 to 0.6, preferably from 0.30 to 0.40,
d is in the range of from zero to 0.05, preferably d is zero.

$$a+b+c+d=1$$

$M^1$ is at least one metal selected from Ca, Zn, Fe, Ti, Ba, Al, and in embodiments in which d≠zero, Al and Ti are preferred for $M^1$.

In one embodiment of the present invention, above general formula (I) is referring to the electrically neutral state of component (a). Preferably, component (a) is one compound of the above general formula (I).

In one embodiment of the present invention, up to 5 mol-% of oxide ions in component (a) may be replaced by fluoride. In other embodiments, component (a) is essentially fluorine-free, that is, fluorine is below 100 ppm, referring to oxide, or even below level of experimental detection. The content of fluoride may be determined by gravimetric analysis, for example as CaF$_2$, or preferably by ion chromatography.

The synthesis of component (a) can be performed in two steps. In a first step, a precursor is being formed, for example by co-precipitation of water-insoluble salts of nickel, manganese and, optionally, of cobalt and/or of $M^1$, such as carbonates, hydroxides, hydroxides-carbonates, oxides and oxyhydroxides. In a second step, the precursor is mixed with a lithium salt such as LiOH or Li$_2$CO$_3$ and said mixture is calcined (fired). In the context of the present invention, said precursor is mixed with a molar excess of lithium compound, referring to the sum of the transition metals including $M^1$. Water-insoluble in the context of synthesis of component (a) means that the respective precursor has a solubility of 0.1 g or less per liter of distilled water at a pH value of 7 and a temperature of 20° C.

Component (b) is a material characterized by the general formula (II)

$$LiFe_{(1-y)}M^2{}_yPO_4 \quad (II)$$

y is in the range of from zero to 0.8, preferably zero to 0.2, $M^2$ is at least one element selected from Ti, Co, Mn, Ni, V, Mg, Nd, Zn and Y, and in embodiments in which y≠zero, $M^2$ being selected from Ti, Co and Mn is preferred.

Component (b) contains at least one further iron-phosphorous compound, in form of a solid solution in compound of general formula (II) or in domains. For example, such further iron-phosphorus compound may be distributed unevenly within component (b), for example in the grain boundaries.

Said further iron-phosphorous compound may be selected from iron phosphates, iron phosphites and iron phosphides. Preferred are iron phosphate such as $FePO_4$ and iron phosphide of formula $Fe_2P$.

In a preferred embodiment, said further iron-phosphorous compound is selected from $FePO_4$, $Li_3Fe_2(PO_4)_3$, $Fe_3(PO_4)_2$ and $Fe_2P_2O_7$ and even more preferably from $Fe_3(PO_4)_2$ and $Fe_2P_2O_7$.

In a solid solution, no phase boundaries can be detected, and the two or more compounds are dispersed evenly through the respective material.

In one embodiment of the present invention, said further iron-phosphorous compound amounts to 0.01 to 10% by weight, referring to compound of general formula (II), preferably up to 5% by weight.

Component (b) may further contain impurities such as $Fe_2O_3$.

Domains may have regular or irregular shape, and they may have an average diameter in the range of from 0.1 to 1 μm.

Component (b) can be manufactured according to various methods, for example by solid state methods or by precipitation methods. In one embodiment, component (b) can be made by a gelling method. Gelling methods can enable the control of the structure of a material on a nanometer scale from the earliest stages of syntheses. An aqueous solution containing a water-soluble iron(III) salt such as $Fe(NO_3)_3$ or $Fe_2(SO_4)_3$, a Li salt such as LiOH or $Li_2CO_3$, a phosphate source such as $NH_4H_2PO_4$ and a reducing agent such as ascorbic acid and, optionally, at least one water-soluble compound of $M^2$, such as $Co(NO_3)_2$, $Mn(NO_3)_2$, $Ni(NO_3)_2$, $VO(NO_3)_2$, $VOCl_2$, $VOCl_3$, $ZnCl_2$, $Zn(NO_3)_2$, $Mg(NO_3)_2$, and the like, is being gelled by evaporation of the water. A xerogel will be obtained that is then dried at temperatures of 300 to 400° C., then mechanically treated and again dried at 450 to 550° C., followed by calcination at 700 to 825° C., preferably under an atmosphere of hydrogen. The reducing agent, preferably ascorbic acid, can also serve as carbon source.

In another embodiment, component (b) can be synthesized under hydrothermal conditions starting from a water-insoluble iron compound as source of iron. In such an embodiment, an aqueous slurry of a water-insoluble iron(III) compound such as $Fe_2O_3$, $Fe_3O_4$, FeOOH, or $Fe(OH)_3$ is mixed with at least one reducing agent such as hydrazine, hydrazine hydrate, hydrazine sulphate, hydroxyl amine, a carbon-based reducing agent such as a primary or secondary alcohol, a reducing sugar, or ascorbic acid, or a reductive phosphorous compound such as $H_3PO_3$ or an ammonium salt thereof, is being prepared. A carbon source such as graphite, soot or active carbon can be added. In case the reducing agent does not bear any phosphorous atom a phosphate source is added, such as phosphoric acid, ammonium phosphate or ammonium (di)hydrogen phosphate, especially $(NH_4)_2HPO_4$ or $NH_4H_2PO_4$. Combinations of $H_3PO_3$ or an ammonium salt thereof and a phosphate source are feasible as well. The slurry so obtained is then reacted at a temperature in the range of from 100 to 350° C. in the presence of a lithium compound such as $Li_2CO_3$, LiOH or the like, preferably for a period of time in the range of from 1 to 24 hours. The reaction can be performed at a pressure in the range of from 1 to 100 bar. The water is then removed, followed by calcination, for example at 700 to 900° C., preferably under an atmosphere of hydrogen.

In another embodiment, component (b) can be synthesized under hydrothermal conditions starting from a water-soluble iron compound as source of iron. In such an embodiment, an aqueous solution of a water soluble iron(II) compound such as $FeSO_4.7H_2O$ or of a water soluble iron(III) compound such as $Fe_2(SO_4)_3.7H_2O$ is mixed with a Li compound, such as $LiOH.H_2O$, and with a phosphorous compound such as $H_3PO_4$, $(NH_4)_3PO_4.3H_2O$, $NH_4H_2PO_4$, or $(NH_4)_2HPO_4$, with or without adding any reducing agent, such as ascorbic acid, and/or with or without adding polyethylene glycol (PEG). The solution so obtained is then processed hydrothermally at 120 to 190° C., preferably above 175° C. After the hydrothermal treatment, in most cases the powder so obtained will be treated at higher temperature, for example in the range of from 600 to 800° C.

In another embodiment, component (b) can be synthesized in a sol-gel process. In such an embodiment, a solution of a water-soluble iron(II) compound such as $Fe(acetate)_2$, a lithium compound such as $Li_2CO_3$ or lithium acetate, and $H_3PO_4$ in at least one organic solvent such as DMF (N,N-dimethyl formamide) is being prepared. The organic solvent(s) are then removed, preferably by evaporation. The residue is then heated stepwise to 700° C. and then calcined at temperatures in the range of from 750 to 850° C. under a reducing atmosphere, for example under hydrogen.

In another embodiment, component (b) can be synthesized from oxalate, such as iron oxalate. Iron oxalate can be used in a solid state process, by preparing a stoichiometric mixture of $FeC_2O_4.2H_2O$ with a lithium compound such as $Li_2CO_3$ or $LiOH.2H_2O$, and with $NH_4H_2PO_4$, in the presence of alcohol, by ballmilling or by using high shear mixer. A carbon source such as polyvinyl alcohol (PVA) or glucose is added and the resultant material is sintered, for example at 600 to 800° C. under reducing atmosphere.

In another embodiment, iron oxalate can be employed for the soft chemistry-rheological phase reaction method, wherein $FeC_2O_4.2H_2O$ is mixed with a lithium compound such as $Li_2CO_3$ and with a phosphorous compound such as $NH_4H_2PO_4$ by thoroughly grinding, adding a polymer such as polyethylene glycol as carbon source. The precursor so obtained will then be heated in an inert atmosphere to 600 to 800° C.

In another embodiment, component (b) can be synthesized from blends of iron phosphate, without or preferably with water of crystallization, and a lithium salt, preferably $Li_2CO_3$, by a solid state reaction in the range of from 650 to 800° C.

In each of the above embodiments, a molar excess of iron compound or the sum of iron and $M^2$, respectively, with respect to lithium compound(s) will be applied.

In formulae of the above compounds, water of crystallization has been neglected.

Water-soluble in the context of starting materials for the synthesis of component (b) refers to compounds that exhibit a solubility of 10 g/l or more in distilled water at 20° C.

Water-insoluble in the context of starting materials for the synthesis of component (b) refers to compounds that exhibit a solubility of 0.1 g/l or less in distilled water at 20° C.

Electrode materials according to the present invention further contain carbon in electrically conductive modification, in brief also referred to as carbon (c). Carbon (c) can be selected from soot, active carbon, carbon nanotubes, graphene, and graphite. Carbon (c) can be added as such during preparation of electrode materials according to the invention, or it can be manufactured in situ together with component (a) or preferably together with component (b), for example by adding an organic compound and calcining any precursor of component (b) together with said organic compound. Polymeric organic compound are preferred examples of organic compounds that may serve as a carbon source.

In one embodiment of the present invention, the weight ratio of component (a) to component (b) is in the range of from 30:70 to 97.5:2.5, preferably in the range of from 80:20 to 95:5 and more preferably of from 85:15 to 95:5. Especially at temperatures over 60° C., the capacity after 30 or more cycles becomes too low if the weight ratio of component (a) to component (b) drops below 30 to 70.

In one embodiment of the present invention, the amount of carbon (c) is in the range of 1 to 8% by weight, referring to component (b), preferably at least 2% by weight.

In one embodiment of the present invention, the surface (BET) of component (b) is in the range of from 5 to 35 m$^2$/g, preferably 7 to 15 m$^2$/g.

In one embodiment of the present invention, the surface (BET) of component (a) is in the range of from 0.2 to 10 m$^2$/g, preferably from 0.3 to 1 m$^2$/g. The surface (BET) can be determined by nitrogen absorption, for example according to DIN ISO 9277 of the year 1995.

In one embodiment of the present invention, primary particles of component (a) have an average diameter in the range from 1 to 2000 nm, preferably from 10 to 1000 nm, particularly preferably from 50 to 500 nm. The average primary particle diameter can, for example, be determined by SEM or TEM.

In one embodiment of the present invention, the particle diameter (D50) of secondary particles of component (a) is in the range from 6 to 16 µm, especially 7 to 9 µm. The mean particle diameter (D50) in the context of the present invention refers to the median of the volume-based particle diameter, as can be determined, for example, by light scattering, especially by LASER scattering technologies, for example at a pressure in the range of from 0.5 to 3 bar.

In one embodiment of the present invention, primary particles of component (b) that contains at least one further iron-phosphorus compound have an average diameter in the range from 1 to 2000 nm, preferably from 10 to 1000 nm, particularly preferably from 50 to 500 nm, even more preferably 100 to 270 nm. The average primary particle diameter can, for example, be determined by SEM or TEM, or by XRD methods. Such XRD methods preferably use the Scherrer Equation where the peak width is inversely proportional to crystallite size.

In one embodiment of the present invention, component (b) that contains at least one further iron-phosphorus compound is in the form of agglomerates of primary particles, such agglomerates having an average diameter (d50) in the range of from 1 µm to 10 µm, preferably 2 to 5 µm, even more preferably 4 to 5 µm.

In one embodiment of the present invention, component (b) that contains at least one further iron-phosphorus compound is coated by a layer of carbon (c) between the primary crystallites (primary particles), and/or on the surface of the secondary particles.

In an embodiment of the present invention, carbon (c) has an average primary particle diameter in the range from 1 to 500 nm, preferably in the range from 2 to 100 nm, particularly preferably in the range from 2 to 50 nm, very particularly preferably in the range from 2 to 4 nm or less.

In one embodiment of the present invention, component (a) according to formula (I) is provided in the form of a gradient material. A gradient material in the context of the present invention refers to particles, in particular to secondary particles, in which the transition metal contents of at least two transition metals are not constant over the radius of the diameter of the particle. Preferably, the contents of manganese is higher in the shell of a particle by 10 to 20 mole %, referring to the sum of Ni, Co, Mn and—if applicable—M$^1$. Preferably, the contents of nickel is higher in the core of a particle by 10 to 20 mole % compared to the shell of the respective particle, referring to the sum of Ni, Co, Mn and of M$^1$ if applicable. In other embodiments, component (a) according to formula (I) has a uniform distribution of the transition metal ion over the diameter of the respective particles.

The materials according to the present invention may in particular serve as cathode materials. A further aspect of the present invention refers to cathodes comprising at least one electrode material according to the present invention. They are particularly useful for lithium ion batteries. Lithium ion batteries comprising at least one electrode according to the present invention exhibit a good discharge behavior, for example at low temperatures (zero ° C. or below, for example down to −10° C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower. Cathodes comprising at least one electrode material according to the present invention are hereinafter also referred to as inventive cathodes or cathodes according to the present invention.

Cathodes according to the present invention can comprise further components. They can comprise a current collector, such as, but not limited to, an aluminum foil. They can further comprise a binder (d).

Suitable binders (d) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (d) is polybutadiene.

Other suitable binders (d) are selected from polyethylene oxide (PEO), cellulose, carboxymethylcellulose, polyimides and polyvinyl alcohol.

In one embodiment of the present invention, binder (d) is selected from those (co)polymers which have an average molecular weight $M_w$ in the range from 50,000 to 1,000,000 g/mol, preferably to 500,000 g/mol.

Binder (d) may be cross-linked or non-cross-linked (co) polymers.

In a particularly preferred embodiment of the present invention, binder (d) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (d) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s) (d), referring to the sum of component (a), component (b) and carbon (c). In other embodiments, inventive cathodes may comprise 0.1 up to less than 1% by weight of binder(s) (d).

A further aspect of the present invention is a battery, containing
(A) at least one cathode comprising component (a), component (b), carbon (c), and binder (d)
(B) at least one anode, and
(C) at least one electrolyte.

Embodiments of cathode (A) have been described above in detail.

Anode (B) may contain at least one anode active material, such as carbon (graphite), $TiO_2$, lithium titanium oxide, silicon or tin. Anode (B) may additionally contain a current collector, for example a metal foil such as a copper foil.

Electrolyte (C) may comprise at least one non-aqueous solvent, at least one electrolyte salt and, optionally, additives.

Nonaqueous solvents for electrolyte (C) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

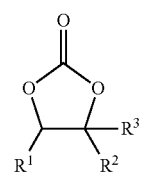

(III)

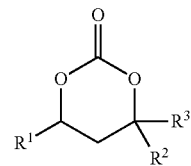

(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

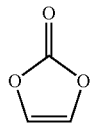 (V)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

EXAMPLES

General remarks: % refer to % by weight unless expressly noted otherwise.

LiOH was used as $LiOH.H_2O$. The amount in the example refers to LiOH without the water. NL: liters under normal conditions (ambient temperature/1 bar).

I. Syntheses of Cathode Active Materials

I.1 Synthesis of Compounds (I)

I.1.1 Synthesis of Compound (I.1)

A precursor $Ni_{0.33}Co_{0.33}Mn_{0.33}(OH)_2$, spherical particles, average particle diameter 10 μm, was mixed with finely milled $Li_2CO_3$. The molar ratio of lithium ($Li_2CO_3$) to the sum of the transition metals in the $Ni_{0.33}Co_{0.33}Mn_{0.33}(OH)_2$ was 1.11. An amount of 40 g of the mixture so obtained was calcined in a box furnace, in rectangular saggers made from sintered aluminum oxide. The calcination was performed under air, with the heating rate being 3 K/min. The calcination temperature program was as follows: heat to 350° C., keep at 350° C. for 4 hours, heat to 675° C., keep at 675° C. for 4 hours, heat to 900° C., keep at 900° C. for 6 hours, then cool to room temperature. After cooling, the compound of formula (I.1)

$$Li_{1.06}[Ni_{0.33}Co_{0.33}Mn_{0.33}]_{0.94}O_2 \qquad (I.1)$$

so obtained was grinded in a mortar. The ground compound (1.1) was sieved with a sieve having 32 μm mesh size. An amount of 30 g of particles of compound (1.1) with a diameter smaller than 32 μm were collected.

I.1.2 Synthesis of Compound (I.2)

A precursor $Ni_{0.4}Co_{0.2}Mn_{0.4}(OH)_2$, spherical particles, average particle diameter 10 μm, was mixed with finely milled $Li_2CO_3$. The molar ratio of lithium ($Li_2CO_3$) to the sum of the transition metals in the $Ni_{0.4}Co_{0.2}Mn_{0.4}(OH)_2$ was 1.13. An amount of 40 g of the mixture so obtained was calcined in a box furnace, in rectangular saggers made from sintered aluminum oxide. The calcination was performed under air, with the heating rate being 3 K/min. The calcination temperature program was as follows: heat to 350° C., keep at 350° C. for 4 hours, heat to 675° C., keep at 675° C. for 4 hours, heat to 925° C., keep at 925° C. for 6 hours, then cool to room temperature. After cooling, the compound of formula (I.2)

$$Li_{1.07}[Ni_{0.4}Co_{0.2}Mn_{0.4}]_{0.93}O_2 \qquad (I.2)$$

so obtained was grinded in a mortar. The ground compound (I.2) was sieved with a sieve having 32 μm mesh size. An amount of 30 g of particles of compound (I.2) with a diameter smaller than 32 μm were collected.

I.2 Synthesis of Components According to Formula (II)
I.2.1 Synthesis of Compound (II.1)

| | |
|---|---|
| 70.7 g | LiOH (2.95 mol) (calculated without water) |
| 280.8 g | α-FeOOH (3.16 mol) calculated as FeOOH |
| 185.6 g | by weight aqueous solution of $H_3PO_4$ (1.61 mol) |
| 134.2 g | $H_3PO_3$ (98%) |
| 46.6 g | starch |
| 46.6 g | lactose |

A 6-l-reactor equipped with mixer and heater was charged with 4,600 g of $H_2O$. The water was heated to temperature of 76° C. Then addition of the ingredients was started. First, the LiOH was added and dissolved within 20 min. Due to exothermic reaction the solution temperature rose to 80.5° C. Then, the α-FeOOH was added and stirred for another 20 min. Then, $H_3PO_4$ and $H_3PO_3$ were added. 20 minutes later, starch and lactose were added in powder form. The temperature of the yellow slurry so obtained was 87° C. Then, 500 g of $H_2O$ were added. The slurry so obtained was stirred for 21 hours at 85° C.

Then, the solid was isolated by spray-drying. The suspension prepared in the above step was spray-dried using $N_2$ (25 $Nm^3/h$) as the drying gas, applying the following spray-drying parameters:

$T_{in}$ 295° C.-298° C.
$T_{out}$ 135° C.-143° C.
Slurry feed: 724.1 g/h

After spray-drying, 125 g of a yellow spray-powder were obtained.

60 g of the spray-powder obtained above were calcined in a rotary quartz-bulb. The rotary bulb was rotating with a speed of 10 rpm. The spray-powder sample was heated from ambient temperature to a temperature of 700° C., with a heating rate of 11.33° C./min. Finally, the material was calcined at a temperature of 700° C. for 1 hour under a stream of $N_2$ flow (16 NL/h). Then, the black material (compound (II.1)) so obtained was cooled down to room temperature. Compound (II.1) of stoichiometry $LiFePO_4 \cdot 0.01\ Fe_3(PO_4)_2$ was sieved to <50 μm. It contained about 3.6% by weight of carbon.

I.2.2 Synthesis of a Lithium Iron Phosphate for Comparative Purposes

The following ingredients were used:

| | |
|---|---|
| 75.6 g | LiOH (3.16 mol) |
| 280.8 g | α-FeOOH (3.16 mol) |
| 182.2 g | 85% by weight aqueous solution of $H_3PO_4$ (1.58 mol) |
| 134.20 g | $H_3PO_3$ (98%) |
| 46.6 g | starch |
| 46.6 g | lactose |

A 6 l reactor equipped with mixer and heater was charged with 4,600 g of $H_2O$. The water was heated to temperature of 76° C. Then addition of the ingredients was started. First, the LiOH—$H_2O$ was added and dissolved within of 20 min. Due to exothermic reaction the solution temperature rose to 80.5° C. Then α-FeOOH was added and stirred for another 20 min. Then, $H_3PO_4$ and $H_3PO_3$ were added. 20 minutes later, starch and lactose were added in powder form. The temperature of the yellow slurry so obtained was 87° C. Then, 500 g of $H_2O$ were added. The slurry obtained was stirred for more than 21 hours at 85° C.

Then, the solid was isolated by spray-drying. The suspension prepared in the above step was spray-dried using $N_2$ (25 $Nm^3/h$) as the drying gas, applying the following spray-drying parameters:

$T_{in}$ 295° C.-298° C.
$T_{out}$ 135° C.-143° C.
Slurry feed: 724.1 g/h

After spray-drying, 122 g of a yellow spray-powder were obtained.

60 g of the spray-powder obtained above were calcined in a rotary quarz-bulb. The rotary bulb was rotating with a speed of 10 rpm. The spray-powder sample was heated from ambient temperature to a temperature of 700° C., with a heating rate of 11.33° C./min. Finally, the material was calcined at a temperature of 700° C. for 1 hour under a stream of $N_2$ flow (16 NL/h). Then, the black material (compound (II.2)) so obtained was cooled down to room temperature. Comparative compound C-(II.2) of the stoichiometry $LiFePO_4$ is obtained, without $Fe_3(PO_4)_2$. It was sieved to <50 μm. It contained about 3.5% by weight of carbon.

II. Manufacture of Cathodes and Batteries According to the Invention, and of Comparative Cathodes and Batteries
II.1 Manufacture of Cathodes and Batteries According to the Invention Four mixtures of compounds (a) and (b) were prepared:

80 g weight of compound (I.1) were blended in a ball-mill with 20 g of compound (II.1) to yield inventive cathode active material CAM.1.

80 g weight of compound (1.1) were blended in a ball-mill with 20 g of comparative compound C(II.2) to yield comparative cathode active material C-CAM.2.

80 g weight of compound (I.2) were blended in a ball-mill with 20 g of compound (II.1) to yield inventive cathode active material CAM.3.

80 g weight of compound (I.2) were blended in a ball-mill with 20 g of comparative compound C(II.2) to yield comparative cathode active material C-CAM.4.

Production of Full Cells:

To produce a cathode (A.1), the following ingredients are blended with one another:

93 g of CAM.1

3 g polyvinylidene difluoride, (d.1) ("PVdF"), commercially available as Kynar Flex® 2801 from Arkema Group, 2.5 g carbon black, (c.1), BET surface area of 62 $m^2/g$, commercially available as "Super C 65L" from Timcal, 1.5 g graphite, (c.2), commercially available as KS6 from Timcal.

While stirring, a sufficient amount of N-methylpyrrolidone (NMP) was added and the mixture was stirred with an Ultraturrax until a stiff, lump-free paste had been obtained.

Cathodes are prepared as follows: On a 30 μm thick aluminum foil the paste is applied with a 15 μm doctor blade. The loading after drying is 2.0 $mAh/cm^2$. The loaded foil is dried for 16 hours in a vacuum oven at 105° C. After cooling to room temperature in a hood, disc-shaped cathodes are punched out of the foil. The cathode discs are then weighed and introduced into an argon glove box where they are again vacuum-dried. Then, cells with the prepared discs are assembled.

Electrochemical testing was conducted in "TC2" cells. The electrolyte (C.1) used was a 1 M solution of $LiPF_6$ in ethyl methyl carbonate/ethylene carbonate (volume ratio 1:1).

Separator (D.1): glass fiber. Anode (B.1): graphite. Potential range of the cell: 2.50 V-4.525 V.

Inventive electrochemical cell (BAT.1) was obtained.

II.2 Manufacture of Cathodes and Electrochemical Cells According to the Invention, and of Comparative Cathodes and Electrochemical Cells For comparative purposes, the above experiment was repeated but inventive (CAM.1) was replaced by an equal amount of C-CAM.2.

Comparative electrochemical cell C-(BAT.2) was obtained.

III. Testing of Batteries

Electrochemical cells according to the invention and comparative electrochemical cells are each subjected to the following cycling program: Potential range of the cell: 2.70 V-4.2 V., 0.1 C (first and second cycles), 0.5 C (from the third cycle). 1 C=150 mA/g. Temperature: 60° C., ambient temperature, and 0° C.

Electrochemical cells (BAT.1) according to the invention show an overall better performance compared to comparative electrochemical cells C-(BAT.2). Especially, charging and discharging behaviour are improved. Without wishing to be bound to any theory we assign the improved charging and discharging behaviour to the improved electric conductivity.

The electric conductivity was determined as follows:

Disc-shaped pellets with a diameter of 1.4 cm and a height of 7 mm were formed from (CAM.1). The electric conductivity was measured in accordance with B. J. Ingram et al., J. Electrochem. Soc. 2003, 150, E396.

As a comparison, disc-shaped pellets with a diameter of 1.4 cm and a height of 7 mm were formed from C-(CAM.2).

The electric conductivities were determined at different pressures. The results were as follows, see Table 1. At a pressure of 500 bar, the diameter of the pellets was in the range of from 1 to 2 mm.

TABLE 1

Results of Conductivity Measurements

| Pressure (bar) | Conductivity (CAM.1) [$10^{-4}$ S/cm] | Conductivity C-(CAM.2) [$10^{-4}$ S/cm] |
| --- | --- | --- |
| 100 | 1.82 | 0.66 |
| 200 | 2.96 | 1.14 |
| 300 | 3.89 | 1.53 |
| 400 | 4.68 | 1.86 |
| 500 | 5.37 | 2.12 |

The invention claimed is:

1. An electrode material, comprising:
   (a) a component comprising a compound of formula (I):

   $$Li_{(1+x)}[Ni_aCo_bMn_cM^1_d]_{(1-x)}O_2 \quad (I),$$

wherein, in formula (I):
   x is in the range of from 0.01 to 0.05,
   a is in the range of from 0.3 to 0.6,
   b is in the range of from zero to 0.35,
   c is in the range of from 0.2 to 0.6,
   d is in the range of from zero to 0.05,
   a+b+c+d=1, and
   $M^1$ is at least one metal selected from the group consisting of Ca, Zn, Fe, Ti, Ba, and Al;
   (b) a component comprising:
   a compound of formula (II):

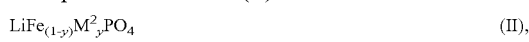
   $$LiFe_{(1-y)}M^2_yPO_4 \quad (II),$$

wherein, in formula (II):
   y is in the range of from zero to 0.8
   $M^2$ is at least one element selected from the group consisting of Ti, Co, Mn, Ni, V, Mg, Nd, Zn and Y, and
   a further iron-phosphorus compound, in form of a solid solution in the compound of formula (II) or in domains, wherein said further iron-phosphorus compound is at least one compound selected from the group consisting of $Fe_3(PO_4)_2$ and $Fe_2P_2O_7$; and
   (c) carbon in electrically conductive modification,
   wherein the compound of formula (II) is obtained by reacting a molar excess of Fe with respect to Li or, if $M^2$ is present, a molar excess of Fe and $M^2$ with respect to Li,
   wherein an average particle diameter, $D_{50}$, of secondary particles of the component (a) is in a range from 6 µm to 16 µm, and
   wherein the component (b) is in the form of agglomerates of primary particles, said agglomerates having an average diameter, $D_{50}$, in a range from 1-10 µm.

2. The electrode material according to claim 1, wherein, in formula (I):
   a is in the range of from 0.32 to 0.50,
   b is in the range of from 0.20 to 0.33,
   c is in the range of from 0.30 to 0.40, and
   d is zero.

3. The electrode material according to claim 1, wherein the component (a) is a gradient material.

4. The electrode material according to claim 1, wherein the component (a) has a BET surface area in the range of from 0.2 $m^2/g$ to 10 $m^2/g$.

5. The electrode material according to claim 1, wherein the component (b) has a BET surface area in the range of from 5 $m^2/g$ to 35 $m^2/g$.

6. The electrode material according to claim 1, wherein the component (b) has a BET surface area in the range of from 5 $m^2/g$ to 15 $m^2/g$.

7. The electrode material according to claim 1, wherein, in formula (II), y is not zero and $M^2$ is Ti, Co, or Mn.

8. The electrode material according to claim 1, wherein the weight ratio of the component (a) to the component (b) is in the range of from 30:70 to 97.5:2.5.

9. The electrode material according to claim 1, wherein the average particle diameter, $D_{50}$, of secondary particles of the component (a) is from 7 µm to 9 µm, and wherein the average diameter, $D_{50}$, of the agglomerates of the primary particles of component (b) is from 2 µm to 5 µm.

10. The electrode material according to claim 1, wherein the further iron-phosphorus compound is in the form of a solid solution in the compound of formula (II).

11. The electrode material according to claim 1, wherein the further iron-phosphorus compound is distributed in grain boundaries.

12. The electrode material according to claim 1, wherein the further iron-phosphorus compound is in domains having an average diameter of 0.1-1 µm.

13. The electrode material according to claim 1, wherein the amount of carbon (c) is in the range of 1 to 8% by weight, relative to the component (b).

14. A cathode, comprising:
   the electrode material according to claim 1; and
   a binder (d).

15. A battery, comprising:
   (A) the cathode of claim 14; (B) an anode; and
   (C) an electrolyte.

16. A method for using a battery according to claim 15, the method comprising:
   incorporating said battery into an automobile or other mobile appliance.

* * * * *

UNITED STATES PATENT AND TRADEMARK OFFICE
CERTIFICATE OF CORRECTION

PATENT NO. : 10,446,833 B2  
APPLICATION NO. : 15/023046  
DATED : October 15, 2019  
INVENTOR(S) : Ivana Krkljus et al.

Page 1 of 1

It is certified that error appears in the above-identified patent and that said Letters Patent is hereby corrected as shown below:

On the Title Page

Column 1, item (54), Title, Line 4, and in the Specification, Column 1, Line 4, "COMPOUND." should read -- COMPOUND, --.

Column 2, item (57), Abstract, Line 2, "$Li_{(1+x)}[Ni_aCO_bMn_cM1_d]_{(1-x)}O_2$ (I)" should read -- $Li_{(1+x)}[Ni_aCo_bMn_cM^1_d]_{(1-x)}O_2$ (I) --.

Column 2, item (57), Abstract, Line 8, "$LiFe_{(1-x)}$" should read -- $LiFe_{(1-y)}$ --.

Column 2, item (57), Abstract, Line 9, "$M2_yPO_4$" should read -- $M^2_yPO_4$ --.

In the Specification

Column 1, Line 12, "$Li_{(1+x)}[Ni_aCO_bMn_cM^1_d]_{(1-x)}O_2$" should read -- $Li_{(1+x)}[Ni_aCo_bMn_cM^1_d]_{(1-x)}O_2$ --.

Column 1, Line 53, "$FePO_4$" should read -- $FePO_4$. --.

Column 1, Line 59, "$LiNi_{1/3} Co_{1/3}Mn_{1/3}O_2$," should read -- $LiNi_{1/3}Co_{1/3}Mn_{1/3}O_2$, --.

Column 2, Line 25, "$Li_{(1+x)}[Ni_aCO_bMn_cM^1_d]_{(1-x)}O_2$" should read -- $Li_{(1+x)}[Ni_aCo_bMn_cM^1_d]_{(1-x)}O_2$ --.

Column 12, Line 7, "quarz-bulb." should read -- quartz-bulb. --.

Column 12, Line 40, "CAM.1" should read -- CAM.1, --.

In the Claims

Column 13, Line 48, Claim 1, "$Li_{(1+x)}[Ni_aCO_bMn_cM^1_d]_{(1-x)}O_2$" should read -- $Li_{(1+x)}[Ni_aCo_bMn_cM^1_d]_{(1-x)}O_2$ --.

Signed and Sealed this  
Twenty-second Day of September, 2020

Andrei Iancu  
*Director of the United States Patent and Trademark Office*